(12) United States Patent
Aoyama

(10) Patent No.: US 8,334,678 B2
(45) Date of Patent: Dec. 18, 2012

(54) VOLTAGE CONTROL APPARATUS FOR AUTOMOTIVE ELECTRIC GENERATOR

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 508 days.

(21) Appl. No.: 12/715,723

(22) Filed: Mar. 2, 2010

(65) Prior Publication Data

US 2010/0225284 A1    Sep. 9, 2010

(30) Foreign Application Priority Data

Mar. 4, 2009   (JP) ................................ 2009-050275

(51) Int. Cl.
  *H02P 9/00*   (2006.01)
(52) U.S. Cl. .......................................... 322/28; 322/37
(58) Field of Classification Search ................... 322/22, 322/25, 28, 29, 37
  See application file for complete search history.

(56) References Cited

U.S. PATENT DOCUMENTS

| | | | | |
|---|---|---|---|---|
| 5,561,363 | A * | 10/1996 | Mashino et al. | 322/25 |
| 6,456,048 | B2 | 9/2002 | Taniguchi et al. | |
| 6,734,653 | B2 * | 5/2004 | Taniguchi et al. | 322/24 |
| 6,815,933 | B2 * | 11/2004 | Taniguchi et al. | 322/28 |
| 7,078,881 | B2 * | 7/2006 | Aoyama | 322/28 |
| 7,285,938 | B2 * | 10/2007 | Aoyama | 322/28 |
| 7,368,893 | B2 * | 5/2008 | Tsuzuki | 322/28 |
| 7,528,585 | B2 | 5/2009 | Maehara | |
| 7,535,203 | B2 * | 5/2009 | Aoyama | 322/24 |
| 8,040,112 | B2 * | 10/2011 | Kikuchi et al. | 322/34 |

FOREIGN PATENT DOCUMENTS

| | | |
|---|---|---|
| JP | A-06-343300 | 12/1994 |
| JP | A-7-123796 | 5/1995 |
| JP | A-09-107640 | 4/1997 |
| JP | A-2002-17053 | 1/2002 |
| JP | A-2007-295659 | 11/2007 |

\* cited by examiner

*Primary Examiner* — Nicholas Ponomarenko
(74) *Attorney, Agent, or Firm* — Oliff & Berridge, PLC

(57) ABSTRACT

A voltage control apparatus for an electric generator includes a load response controller and a voltage response controller. The electric generator includes a field winding and is driven by an engine of a motor vehicle. When the output voltage of the generator decreases below a threshold voltage upon the application of an electrical load, the rotational speed of the engine fluctuates to repeatedly increase and decrease until it is stabilized. During the time periods in which the rotational speed of the engine decreases, field current supplied to the field winding of the generator is gradually increased under a load response control performed by the load response controller. During the time periods in which the rotational speed of the engine increases, the field current is gradually increased under a voltage response control by the voltage response controller.

3 Claims, 2 Drawing Sheets

VOLTAGE CONTROL APPARATUS FOR AUTOMOTIVE ELECTRIC GENERATOR

CROSS-REFERENCE TO RELATED APPLICATION

This application is based on and claims priority from Japanese Patent Application No. 2009-50275, filed on Mar. 4, 2009, the content of which is hereby incorporated by reference in its entirety into this application.

BACKGROUND OF THE INVENTION

1. Technical Field of the Invention

The present invention relates to voltage control apparatuses for controlling output voltages of electric generators that are used in motor vehicles such as passenger cars and trucks.

2. Description of the Related Art

In recent years, to reduce emissions from motor vehicles and improve the fuel economy of the same, both engine idle speed and engine friction have been lowered. As a result, a variation in the torque of an automotive electric generator, which is driven by the engine of a motor vehicle, may cause hunting of the engine to occur in some rotational speed region. Hereinafter, hunting of the engine denotes a phenomenon in which the rotational speed of the engine fluctuates and thus cannot keep constant.

To prevent hunting of the engine from occurring due to a variation in the torque of an automotive electric generator, Japanese Unexamined Patent Application Publication No. 2002-17053 (to be referred to as Patent Document 1 hereinafter) discloses an approach. According to this approach, the generator is controlled by setting a target voltage of the generator according the rotational speed of the generator. Consequently, it becomes possible to prevent hunting of the engine from occurring in a rotational speed region in which the torque of the generator suddenly changes from increasing to decreasing or vice versa over the torque peak of the generator. Hereinafter, the torque peak denotes an operating point of the generator at which the torque of the generator reaches its peak.

However, with the aging of an automotive battery that is charged by the generator, the drop in the terminal voltage of the battery due to the application of an electrical load may become large. Therefore, with the approach disclosed in Patent Document 1, it may be difficult for the rotational speed of the engine to follow the large drop in the terminal voltage of the battery. As a result, the large drop in the terminal voltage of the battery may trigger hunting of the engine so that the rotational speed of the engine fluctuates and gradually converges on a target idle speed.

Moreover, with the approach disclosed in Patent Document 1, since the target voltage of the generator is set according to the rotational speed of the generator, the target voltage also fluctuates in sync with the rotational speed of the engine. Consequently, the charging voltage of the battery also fluctuates, influencing the brightness of lighting and display devices on the vehicle and thereby making the driver of the vehicle uncomfortable.

In addition, Patent Document 1 also introduces another approach that is originally disclosed in Japanese Unexamined Patent Application Publication No. H7-123796 (to be referred to as Patent Document 2 hereinafter). According to this approach, upon detection of the application of an electrical load, the target voltage of the generator is lowered once and then gradually returned to its original value.

However, with the approach disclosed in Patent Document 2, it is difficult to detect the application of an electrical load without a delay only when the engine is idling. Moreover, it is also difficult to suppress the fluctuation of the rotational speed of the engine during idling of the engine only by means of a voltage control apparatus that regulates the output voltage of the generator to the target voltage.

Japanese Unexamined Patent Application Publication No. 2007-295659 (to be referred to as Patent Document 3 hereinafter) discloses still another approach for suppressing fluctuation of the rotational speed of an engine during its idling in a rotational speed region higher than the torque peak speed of the engine. Hereinafter, the torque peak speed of the engine denotes the rotational speed of the engine when the torque of an electric generator driven by the engine is at its peak. Similarly, the torque peak speed of an electric generator denotes the rotational speed of the generator when the torque of the generator is at its peak.

More specifically, according to the approach disclosed in Patent Document 3, when a decrease in the rotational speed of the generator is detected, a field current control is performed to limit field current supplied to the generator. Consequently, the decrease in the rotational speed is suppressed, thereby suppressing the drop in the terminal voltage of an automotive battery that is charged by the generator. On the other hand, when no decrease in the rotational speed of the generator is detected, the field current control is disabled, thereby allowing the output voltage of the generator to be regulated to a target voltage. As a result, with this approach, it is possible to stabilize both the idle rotation of the engine and the terminal voltage of the battery.

However, with the approach disclosed in Patent Document 3, it may be difficult to achieve the above-described effects when the rotational speed of the generator decreases below the torque peak speed of the generator.

SUMMARY OF THE INVENTION

According to the present invention, there is provided a voltage control apparatus for controlling an output voltage of an electric generator. The electric generator includes a field winding and is driven by an engine of a motor vehicle and electrically connected to charge a battery. The voltage control apparatus includes a switching element, a voltage regulator, a load response controller, and a voltage response controller. The switching element is electrically connected in series with the field winding of the electric generator. The voltage regulator regulates the output voltage of the electric generator to a target voltage of the electric generator by selectively turning on and off the switching element. The load response controller performs a load response control when the output voltage of the electric generator decreases below the target voltage upon the application of an electrical load to the electric generator. In the load response control, the load response controller controls the on/off operation of the switching element to gradually increase field current supplied to the field winding of the electric generator. The voltage response controller performs a voltage response control when the output voltage of the electric generator decreases below a threshold voltage upon the application of the electrical load. In the voltage response control, the voltage response controller first changes the target voltage from a first predetermined value to a second predetermined value, the second predetermined value being lower than the first predetermined value but higher than the threshold voltage, and then gradually recovers the target voltage from the second predetermined value to the first predetermined value after the output voltage of the electric generator is recovered to exceed the threshold voltage. Furthermore, when the output voltage of the electric generator decreases below the threshold voltage upon the application of the electrical load, the rotational speed of the engine fluctuates to repeatedly increase and decrease until it is stabilized. During the time periods in which the rotational speed of the engine decreases, the field current is gradually increased under the load response control by the load response controller. During the time periods in which the rotational speed of the engine increases, the field current is gradually increased under the voltage response control by the voltage response controller.

With the above configuration, it is possible to suppress the increase in the field current by the load response control when the rotational speed of the engine decreases and by the voltage response control when the rotational speed of the engine increases. Consequently, it becomes possible to suppress the increase in the field current for the entire time period from the application of the electrical load to the stabilization of the rotational speed of the engine. As a result, it becomes possible to effectively suppress the fluctuation in the output voltage of the generator, thereby realizing an early stabilization of the rotational speed of the engine.

In particular, by suppressing the increase in the field current through the voltage response control when the rotational speed of the engine increases, it becomes possible to effectively suppress the peak torque of the generator, thereby allowing the rotational speed of the engine to be stabilized in an earlier stage.

Preferably, the voltage control apparatus further includes a rotational speed response controller and a disabler. The rotational speed response controller performs a rotational speed response control in which the rotational speed response controller sets the target voltage of the electric generator according to the rotational speed of the electric generator. The disabler disables, when the output voltage of the electric generator decreases below the threshold voltage upon the application of the electrical load, the rotational speed response control for a predetermine time period from the decrease in the output voltage of the electric generator.

With the above configuration, when the output voltage of the electric generator is above the threshold voltage, it is possible to achieve the same effects as Japanese Unexamined Patent Application Publication. No. 2002-17053. Moreover, when the output voltage of the electric generator decreases below the threshold voltage, it is possible to prevent the output voltage of the generator from fluctuating in synch with the rotational speed of the engine, thereby allowing the output voltage to be stabilized in an earlier stage.

Further, the predetermined time period, for which the disabler disables the rotational speed response control, is preferably set to be longer than the time period from the decrease in the output voltage of the electric generator below the threshold voltage to the recovery of the target voltage of the electric generator to the first predetermined value.

With the above configuration, it is possible to more reliably suppress the increase in the field current by the voltage response control when the rotational speed Ne of the engine increases.

In the load response control, the load response controller may increase the field current linearly with time at a predetermined rate.

The voltage response controller may include a delay circuit that has a given time constant. In the voltage response control, the voltage response controller may increase the target voltage from the second predetermined value to the first predetermined value with the time constant of the delay circuit. During the time periods in which the rotational speed of the engine increases, the field current may be increased following the increase in the target voltage of the electric generator.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

One preferred embodiment of the present invention will be described hereinafter with reference to FIGS. 1-2.

Figure 1:
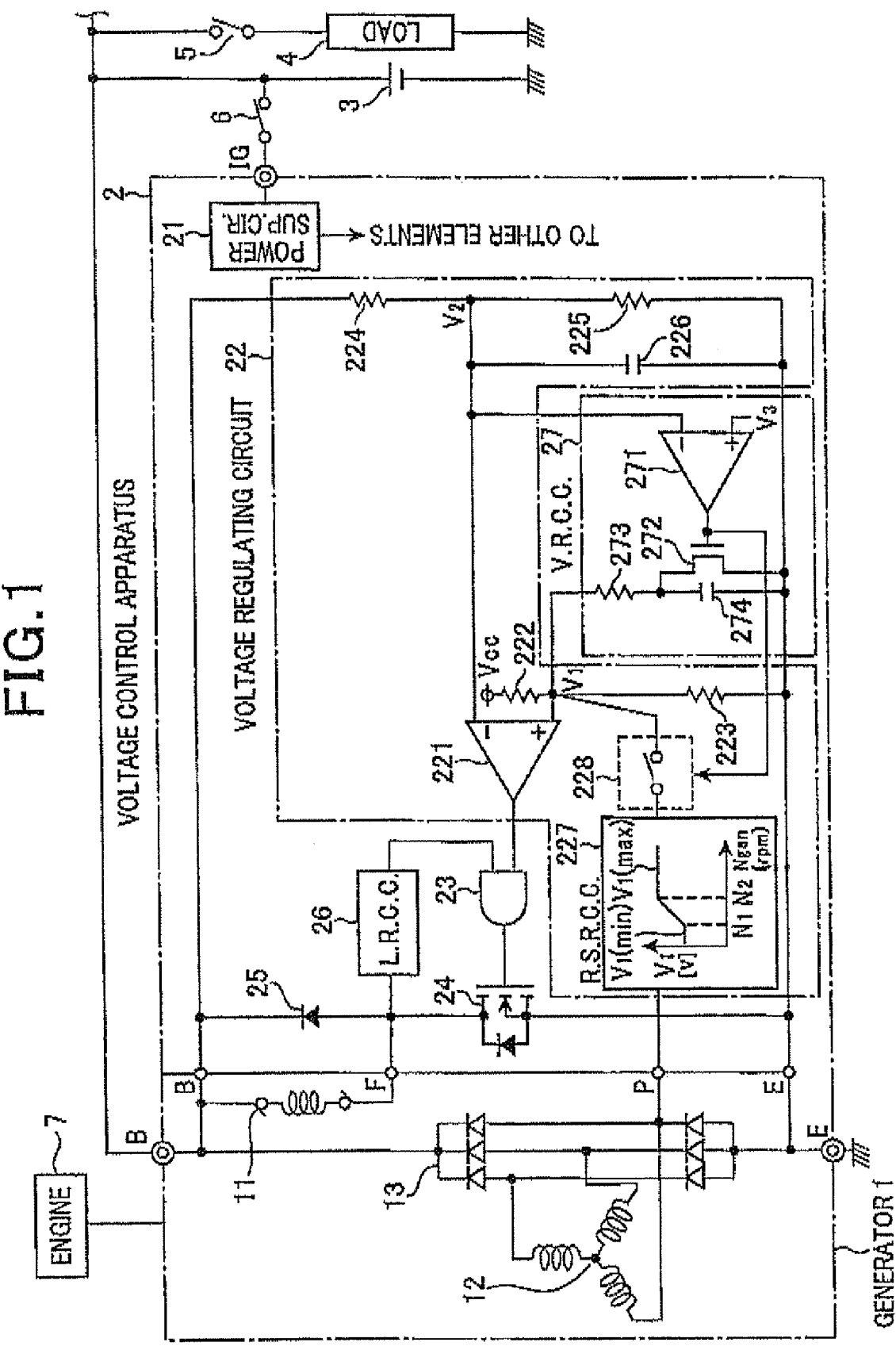
FIG. 1 is a schematic diagram showing the configuration of a voltage control apparatus for an automotive electric generator according to the preferred embodiment of the invention.

FIG. 1 shows the configuration of a voltage control apparatus 2 according to the preferred embodiment and its electrical connection with an automotive electric generator 1, a battery 3, and an electrical load (e.g., a headlight) 4.

As shown in FIG. 1, the voltage control apparatus 2 is electrically connected to the generator 1 to control the output voltage VB of the generator 1 at an output terminal (or battery terminal) B of the generator 1. The output terminal B is also electrically connected to the battery 3 and the electrical load 4.

The generator 1 includes a field winding 11, a three-phase stator winding 12, and a rectifier 13.

The field winding 11 is wound around a field pole (not shown) to form a rotor of the generator 1. The rotor creates a rotating magnetic field when field current is supplied to the field winding 11 during rotation of the rotor.

The stator winding 12 is wound around a stator core (not shown) to form a stator of the generator 1. The stator outputs three-phase AC power that is induced in the stator winding 12 by the rotating magnetic field created by the rotor. In addition, one phase of the stator winding 12 is electrically connected to a P terminal of the voltage control apparatus 2, so that a single-phase voltage of the stator winding 12 can be outputted to the P terminal.

The rectifier 13 is configured to full-wave rectify the three-phase AC power outputted from the stator winding 12 into DC power. The DC power is then outputted, via the output terminal B, to charge the battery 3 as well as power the electrical load 4 and other electrical loads that are not shown in FIG. 1. In the present embodiment, the DC power represents the output power of the generator 1 and the voltage of the DC power at the output terminal B represents the output voltage VB of the generator 1.

The generator 1 is configured to be driven by an engine 7 of a motor vehicle. Therefore, the rotational speed of the generator 1, which is represented by the rotational speed of the rotor of the generator 1, depends on the rotational speed of the engine 7. Moreover, the output power of the generator 1 depends on the rotational speed of the generator 1, the output voltage VB of the generator 1, and the field current supplied to the field winding 11. Accordingly, the output power of the generator 1 can be controlled by controlling at least one of the three parameters.

The voltage control apparatus 2 includes a power supply circuit 21, a voltage regulating circuit 22, an AND gate 23, a switching element 24, a freewheeling diode 25, a load response control circuit (abbreviated to L. R. C. C. in FIG. 1) 26, a voltage response control circuit (abbreviated to V. R. C. C. in FIG. 1) 27.

The power supply circuit 21 is electrically connected to an IG (ignition) terminal of the voltage control apparatus 2. The IG terminal is further electrically connected, via a key switch 6 of the vehicle, to the battery 3. The power supply circuit 21 is configured to supply, when the key switch 6 is turned on, an operation voltage Vcc to other elements of the voltage control apparatus 2 for enabling them to normally function.

The voltage regulating circuit 22 inputs the output voltage VB of the generator 1. Moreover, an output terminal of a voltage comparator 221 of the voltage regulating circuit 22 is electrically connected to one of two input terminals of the AND gate 23. The details of the voltage regulating circuit 22 will be described later. The other input terminal of the AND gate 23 is electrically connected to an output terminal of the load response control circuit 26. On the other hand, the output terminal of the AND gate 23 is electrically connected to the switching element 24.

The switching element 24 is implemented by a power transistor in the present embodiment. The switching element 24 has its gate electrically connected to the output terminal of the AND gate 23, its drain electrically connected to the output terminal B of the generator 1 via the freewheeling diode 25, and its source electrically connected to an E (Earth) terminal of the voltage control apparatus 2. The E terminal of the voltage control apparatus 2 is further electrically connected to an E (Earth) terminal of the generator 1 so as to be earthed (or grounded) via the E terminal of the generator 1. Moreover, the drain of the switching element 24 is also electrically connected to the field winding 11 of the generator 1 via an F (Field) terminal of the voltage control apparatus 2. Consequently, when the switching element 24 is turned on, the field current flows from the output terminal B of the generator 1, through the field winding 11, to the E terminal of the generator 1. Further, when the switching element 24 is turned off, the flow of the field current is interrupted. That is to say, the switching element 24 is electrically connected in series with the field winding 11 so that supply of the field current to the field winding 11 can be controlled by controlling the on/off operation of the switching element 24.

The freewheeling diode 25 is electrically connected in parallel with the field winding 11 of the generator 1, so that the field current flowing in the field winding 11 can be recovered when the switching element 24 is turned off.

The load response control circuit 26 has an input terminal electrically connected to the junction point (or terminal) between the field winding 11 and the switching element 24. Moreover, as described previously, the output terminal of the load response control circuit 26 is electrically connected to one of the two input terminal of the AND gate 23.

The load response control circuit 26 performs a load response control so as to suppress the drop in the rotational speed of the engine 7 which is caused by an increase in the torque of the generator 1 due to the application of an electrical load. For example, when the electrical load 4 is applied by turning on a load switch 5, the output voltage VB of the generator 1 will be lowered. Then, the voltage control apparatus 2 will increase the field current supplied to the field winding 11, so as to increase the output power of the generator 1. Consequently, the torque of the generator 1 will also be increased, thereby causing the rotational speed of the engine 7 to drop. Therefore, to suppress the drop in the rotational speed of the engine 7, the load response control circuit 26 performs the load response control to gradually increase the field current supplied to the field winding 11, thereby preventing the torque of the generator 1 from suddenly increasing.

The voltage response control circuit 27 has an input terminal electrically connected to the junction point between resistors 224 and 225 of the voltage regulating circuit 22 and an output terminal electrically connected to the junction point between resistors 222 and 223 of the voltage regulating circuit 22. The details of the voltage response control circuit 27 will be described later.

Next, the voltage regulating circuit 22 win be described in detail. The voltage regulating circuit 22 includes the voltage comparator 221, the resistors 222, 223, 224, and 225, a capacitor 226, and a rotational speed response control circuit (abbreviated to R. S. R. C. C. in FIG. 1) 227, and a shift circuit 228.

The voltage comparator 221 has a plus (+) input terminal via which a reference voltage V1 is inputted. The reference voltage V1 is obtained by, for example, dividing the operation voltage Vcc with the resistors 222 and 223 and corresponds to a target voltage (e.g., 14V) for the output voltage VB of the generator 1. The voltage comparator 22 also has a minus (−) input terminal via which an indication voltage V2 is inputted. The indication voltage V2 is obtained by dividing the actual output voltage VB of the generator 1 with the resistors 224 and 225 and is thus indicative of the actual output voltage VB of the generator 1.

The capacitor 226 is electrically connected to the minus input terminal of the voltage comparator 221. The capacitor 226 is provided to remove noise from the output voltage VB of the generator 1, thereby stabilizing control of the on/off operation of the switching element 24.

The rotational speed response control circuit 227 has a characteristic curve stored therein, which represents a predefined relationship between the rotational speed of the generator 1 and the target voltage of the generator 1. The rotational speed response control circuit 227 has an input terminal electrically connected to the P terminal of the voltage control apparatus 2 and an output terminal that is electrically connected, via the shift circuit 228, to the junction point between the resistors 222 and 223.

The rotational speed response control circuit 227 performs a rotational speed response control to prevent hunting of the engine 7 from occurring. In the rotational speed response control, the rotational speed response control circuit 227 detects the rotational speed Ngen of the generator 1 based on the frequency of the single-phase voltage of the stator winding 12 of the generator 1 inputted via the P terminal. Then, the rotational speed response control circuit 227 sets the target voltage of the generator 1 according to the detected rotational speed Ngen.

More specifically, the rotational speed response control circuit 227 sets the reference voltage V1 to a minimum value V1(min) when the detected rotational speed Ngen of the generator 1 is below a lower threshold N1, to a maximum value V1(max) when the detected Ngen is above an upper threshold N2, and to a value that is linearly determined between the minimum and maximum values V1(min) and V1(max) when the detected Ngen is between N1 and N2. In addition, the minimum value V1(min) of the reference voltage V1 corresponds to a value of the target voltage of the generator 1 being equal to, for example, 12.8V, while the maximum value V1(max) corresponds to a value of the target voltage being equal to, for example 14V. That is, in the present embodiment, the target voltage of the generator 1 is set by setting the reference voltage V1.

The shift circuit 228 forms a switch that is turned on and off according to the output signal of a voltage comparator 271 of the voltage response control circuit 27. In addition, it should be noted that the switch may also be formed with a semiconductor analog switch instead of the shift circuit 228.

Next, the voltage response control circuit 27 will be described in detail. The voltage response control circuit 27 includes the voltage comparator 271, a transistor 272, a resistor 273, and a capacitor 274.

The voltage comparator 271 has a plus (+) input terminal via which a reference voltage V3 is inputted. The reference voltage V3 is used for detecting an excessive drop in the output voltage VB of the generator 1 (or the terminal voltage of the battery 3) and represents a threshold voltage of, for example, 11.8V. The voltage comparator 271 also has a minus (−) input terminal via which the indication voltage V2 is inputted. As described previously, the indication voltage V2 is obtained by dividing the actual output voltage VB of the generator 1 with the resistors 224 and 225 and is thus indicative of the actual output voltage VB of the generator 1. Moreover, the voltage comparator 271 has an output terminal that is electrically connected to the gate of the transistor 272.

The transistor 272 has its drain electrically connected to the junction point between one end of the resistor 273 and one end of the capacitor 274, and its source electrically connected to the E terminal of the voltage control apparatus 2. The other end of the resistor 273 is electrically connected to the junction point between the resistors 222 and 223. The other end of the capacitor 274 is electrically connected to the E terminal of the voltage control apparatus 2.

After having described the configuration of the voltage control apparatus 2 according to the present embodiment, operation thereof will be described hereinafter.

When the key switch 6 of the vehicle is turned on, the power supply circuit 21 supplies the operation voltage Vcc to other elements of the voltage control apparatus 2, thereby enabling them to normally function.

In the voltage comparator 221 of the voltage regulating circuit 22, the indication voltage V2, which indicates the actual output voltage VB of the generator 1, is lower than the reference voltage V1 that represents the target voltage of the generator 1 being equal to, for example, 14V. Consequently, the level of the output signal of the voltage comparator 221 becomes high. Moreover, the level of the output signal of the load response control circuit 26 also is high, resulting in a high level of the output signal of the AND gate 23. As a result, the switching element 24 is turned on, allowing the field current to be supplied to the field winding 11 of the generator 1.

Then, the engine 7 of the vehicle is started by a starter (not shown) of the vehicle, and drives the generator 1 to rotate. With rotation of the generator 1, electric power is generated by the generator 1.

When the output voltage VB of the generator 1 is increased to exceed the target voltage of 14V, the indication voltage V2 becomes higher than the reference voltage V1, causing the level of the output signal of the voltage comparator 221 to be changed from high to low. Consequently, the level of the output signal of the AND gate 23 is also changed from high to low, thereby turning the switching element 24 off. As a result, the supply of the field current to the field winding 11 of the generator 1 is interrupted, causing the output voltage VB of the generator 1 to be decreased.

Further, when the output voltage VB of the generator 1 decreases below the target voltage of 14V, the indication voltage V2 becomes lower than the reference voltage V1, causing the level of the output signal of the voltage comparator 221 to be changed from low to high. Consequently, the level of the output signal of the AND gate 23 is also changed from low to high, thereby turning the switching element 24 off. As a result, the supply of the field current to the field winding 11 of the generator 1 is resumed, causing the output voltage VB of the generator 1 to be increased.

By repeating the above processes, the output voltage VB of the generator 1 is regulated by the voltage regulating circuit 22 to the target voltage of 14V.

While the voltage regulating circuit 22 regulates the output voltage VB of the generator 1, the load response control circuit 26 detects the duty cycle of the voltage at the F terminal of the voltage control apparatus 2 as the duty cycle of the on/off operation of the switching element 24. Then, the load response control circuit 26 outputs to the AND gate 23 a pulse signal whose duty cycle is determined by adding a predetermined value to the detected duty cycle.

Further, when the electrical load 4 is applied without causing the output voltage VB of the generator 1 to drop below the threshold voltage of 11.8 V (i.e., without causing V2 to drop below V3), the load response control circuit 26 performs the load response control to gradually increase the field current supplied to the field winding 11 until the output voltage VB of the generator 1 reaches the target voltage of 14V. Specifically, the load response control circuit 26 gradually increases the duty cycle of its output signal. More specifically, the load response control circuit 26 preferably first increases the duty cycle in one step by a given amount and then linearly increase the duty cycle at a predetermined rate $\Delta If/\Delta t$.

Furthermore, when the rotational speed Ngen of the generator 1 is decreased with the rotational speed of the engine 7 below the torque peak speed of the generator 1, the rotational speed Ngen will fall in the range between N1 to N2. In this case, the rotational speed response control circuit 227 performs the rotational speed response control to set the target voltage of the generator 1 according to the rotational speed Ngen of the generator 1. Consequently, by regulating the output voltage VB of the generator 1 to the target voltage set by the rotational speed response control circuit 227, the rotational speed of the engine 7 can be made to converge on the target idle speed without causing hunting of the engine 7. In addition, more details of such a target voltage setting can be found, for example, in Japanese Unexamined Patent Application Publication No. 2002-17053.

On the other hand, when the electrical load 4 is applied to cause the output voltage VB of the generator 1 to drop below the threshold voltage of 11.8 V (i.e., to cause V2 to drop below V3), the voltage response control circuit 27 performs a, voltage response control.

More specifically, when the output voltage VB of the generator 1 is lowered below the threshold voltage, the level of the output signal of the voltage comparator 271 becomes high. Consequently, the transistor 272 is turned on, thereby discharging the electric charge stored in the capacitor 274. Moreover, the resistor 273 is brought into parallel electrical connection with the resistor 223, so that the reference voltage V1 is lowered from a first predetermined value V11 to a second predetermined value V12. The first predetermined value V11 of the reference voltage V1 is obtained by dividing the operation voltage Vcc with the resistors 222 and 223 and corresponds to a first predetermined value of the target voltage of the generator 1. The second predetermined value V12 of the reference voltage V1 is obtained by dividing the operation voltage Vcc with the resistors 222, 223, and 273 and corresponds to a second predetermined value of the target voltage of the generator 1. In addition, the first and second predetermined values of the target voltage of the generator 1 are respectively equal to, for example, 14V and 12V.

Further, with power generation of the generator 1, the battery 3 is charged and the output voltage VB of the generator 1 is subsequently recovered to exceed the threshold voltage of 11.8V. Then, the level of the output signal of the voltage comparator 271 becomes low, thereby turning the transistor 272 off. Consequently, the terminal voltage of the capacitor 274 increases with the time constant $\tau$ of the electric circuit composed of the resistors 222, 223, and 273 and the capacitor 274. As a result, the target voltage of the generator 1 is raised from the second predetermined value (i.e., 12V) to the first predetermined value (i.e., 14V) with the time constant $\tau$. Thereafter, the output voltage VB of the generator 1 is regulated to the first predetermined value of the target voltage by the voltage regulating circuit 22. In addition, the time constant $\tau$ is set to be longer than the period of rotational fluctuation of the engine 7.

Figure 2:
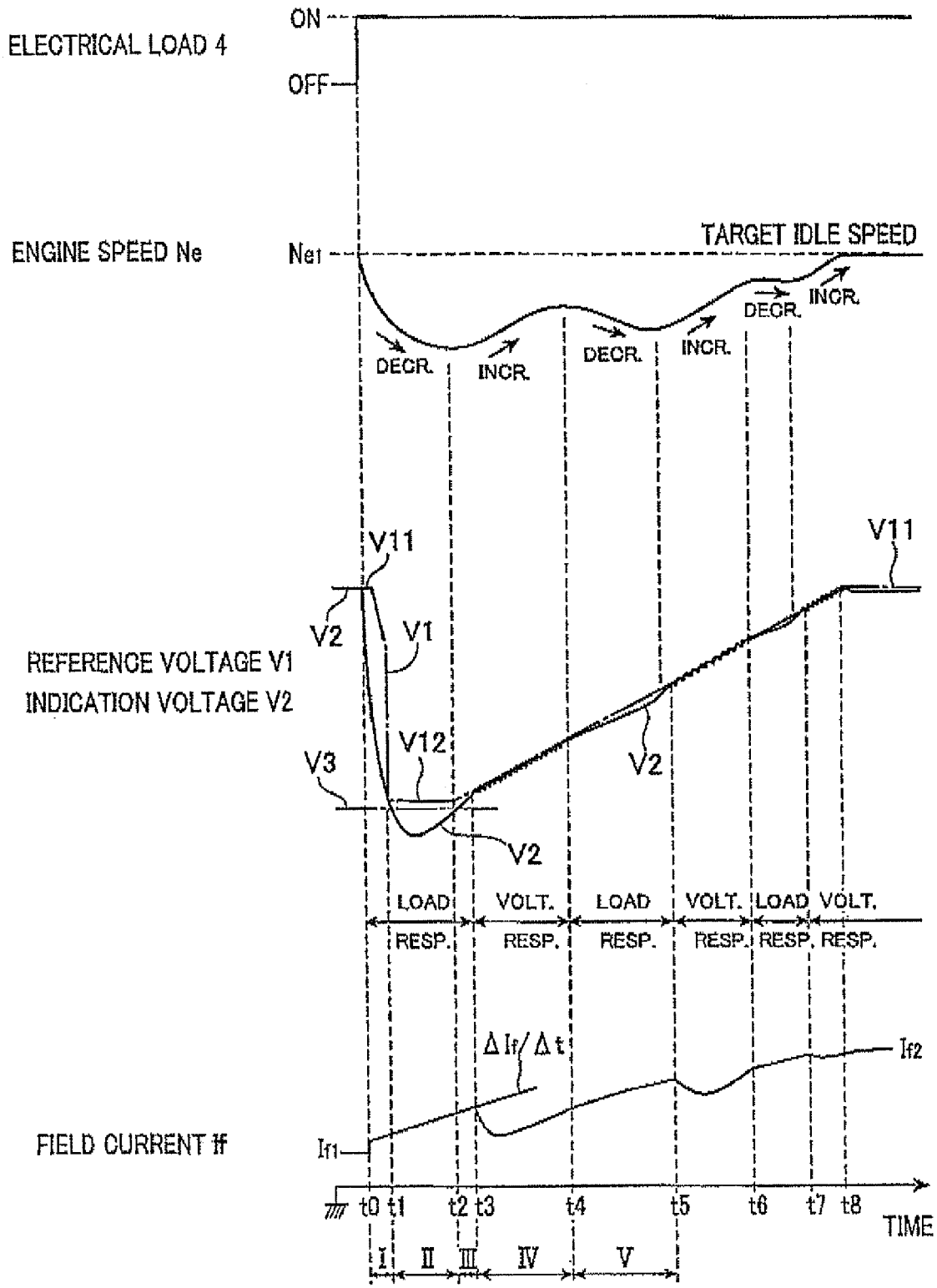
FIG. 2 is a time chart illustrating the changes in parameters when an electrical load is applied to the generator with the voltage control apparatus controlling the output voltage of the generator.

FIG. 2 illustrates the changes in the rotational speed Ne of the engine 7, the reference voltage V1, the indication voltage V2, and the field current If during the time period from the application of the electrical load 4 to the convergence of the rotational speed Ne on the target idle speed Ne1.

Assume that the engine 7 is initially idling at the target idling speed Ne1, the generator 1 is initially generating electric power with the field current If being equal to If1, and the output voltage VB of the generator 1 is initially regulated by the voltage control apparatus 2 to the first predetermined value (i.e., 14V) of the target voltage.

At time instant t0, the electrical load 4 is applied by turning on the load switch 5. Consequently, the output voltage VB of the generator 1 is lowered, and thus the indication voltage V2 is also lowered. Then, the load response control circuit 26 performs the load response control so that the field current If is first increased in one step by a given amount and then linearly increased with time at the predetermined rate $\Delta$If/$\Delta$t. As a result, with the increase in the field current If, the torque of the generator 1 is also increased, thereby decreasing the rotational speed Ne of the engine 7, The decrease in the rotational speed Ne of the engine 7 causes the toque of the generator 1 to further increase, and the further increase in the torque of the generator causes the rotational speed Ne of the engine 7 to be further decreased below the torque peak speed of the engine 7. In this case, an engine control is performed on the engine 7 so as to bring the rotational speed Ne of the engine 7 back to the target idle speed Ne1. However, there is a response delay to the engine 7 control. Consequently, the rotational speed Ne of the engine 7 repeats decreasing and increasing until it converges on the target idle speed Ne1.

At time instant t1, the output voltage VB of the generator 1 drops below the threshold voltage of 11.8V, and thus the indication voltage V2 accordingly becomes lower than the reference voltage V3. Consequently, the level of the output signal of the voltage comparator 271 becomes high, thereby turning the transistor 272 on. As a result, the reference voltage V1, which has been decreased somewhat by the rotational speed response control circuit 227 according to the rotational speed Ne of the engine 7, is set to the second predetermined value V12. As described previously, the second predetermined value V12 of the reference voltage V1 corresponds to the second predetermined value (i.e., 12V) of the target voltage of the generator 1. In addition, the time period from time instant t0 to time instant t1 is indicated with I in FIG. 2.

Moreover, during time period I, the high-level output signal of the voltage comparator 271 is also inputted to the shift circuit 228, thereby turning the switch formed by the shift circuit 228 off. Consequently, the rotational speed response control by the rotational speed response control circuit 227 is disabled.

In the time period from time instant t1 to time instant t2, which is indicated with II in FIG. 2, the field current If is continuously increased at the predetermined rate $\Delta$If/$\Delta$t under the load response control by the load response control circuit 26. Consequently, the output voltage VB of the generator 1 starts to increase, reaching the threshold voltage of 11.8 v at time instant t2. Thus, the indication voltage V2 also starts to increase, reaching the reference voltage V3 at time instant t2.

After time instant t2, the indication voltage V2 surpasses the reference voltage V3, so that the level of the output signal of the voltage comparator 271 becomes low, thereby turning the transistor 272 off. Then, charge current flows to the capacitor 274, and the reference voltage V1 is increased from the second predetermined value V12 toward the first predetermined value V11 with the time constant $\tau$ of the electric circuit composed of the resistors 222, 223, and 273 and the capacitor 274.

During the time period from time instant t0 to time instant t3, the rotational speed Ne of the engine 7 keeps decreasing and the field current If is continuously increased at the predetermined rate $\Delta$If/$\Delta$t under the load response control by the load response control circuit 26.

At time instant t3, the rotational speed Ne of the engine 7 starts to increase and the indication voltage V2 becomes higher than the reference voltage V1. Then, the load response control by the load response control circuit 26 is stopped, and the output voltage VB of the generator 1 is regulated by the voltage regulating circuit 22 to the target voltage of the generator 1 that is increasing with the reference voltage V1 due to the transient response of the voltage response control circuit 27 to the change in the indication voltage V2 (or to the change in the output voltage VB of the generator 1). Consequently, the field current If is decreased once and then gradually increased following the increase in the reference voltage V1.

At time instant t4, the rotational speed Ne of the engine 7 starts to decrease and the indication voltage V2 becomes lower than the reference voltage V1. Consequently, the level of the output signal of the voltage comparator 221 becomes high. As a result, for the time period from time instant t4 to time instant t5, which is indicated with V in FIG. 2, the field current If is gradually increased at the predetermined rate $\Delta$If/$\Delta$t under the load response control by the load response control circuit 26.

At time instant t5, the rotational speed Ne of the engine 7 starts to increase and the indication voltage V2 becomes higher than the reference voltage V1. Then, for the time period from time instant t5 to time instant t6, the load response control by the load response control circuit 26 is stopped, and the output voltage VB of the generator 1 is regulated by the voltage regulating circuit 22 to the target voltage of the generator 1 that is increasing with the reference voltage V1. Consequently, the field current If is decreased once and then gradually increased following the increase in the reference voltage V1.

At time instant t6, the rotational speed Ne of the engine 7 starts to decrease and the indication voltage V2 becomes lower than the reference voltage V1. Then, for the time period from time period t6 to time period t7, the field current If is gradually increased at the predetermined rate $\Delta$If/$\Delta$t under the load response control by the load response control circuit 26.

At time instant t7, the rotational speed Ne of the engine 7 starts to increase and the indication voltage V2 becomes higher than the reference voltage V1. Then, for the time period from time instant t7 to time instant t8, the load response control by the load response control circuit 26 is stopped, and the output voltage VB of the generator 1 is regulated to the target voltage of the generator 1 that is increasing with the reference voltage V1. Consequently, the field current If is decreased once and then gradually increased following the increase in the reference voltage V1.

After repeating increasing and decreasing as described above, the rotational speed Ne of the engine 7 comes to converge on the target idle speed Ne1.

Then, at time instant t8, the reference voltage V1 is recovered to the first value V11 so that the output voltage VB of the generator 1 comes to be regulated, to the first predetermined value (i.e., 14V) of the target voltage. As a result, the electric generator 1 comes to generate electric power with the field current If being equal to If2, thereby charging the battery 3 and powering the newly-applied electrical load 4 and other existing electrical loads.

In addition, in the present embodiment, the switch of the shift circuit 228 is so configured as to be turned on after a predetermined time from time instant t8 at which the target voltage of the generator 1 is recovered to the first predetermined value V11. Consequently, the rotational speed response control circuit 227 is enabled again after the convergence of the rotational speed Ne of the engine 7 on the target idle speed Ne1.

The above-described voltage control apparatus 2 according to the present embodiment has the following advantages.

In the present embodiment, the voltage control apparatus 2 controls the output voltage VB of the electric generator 1. The voltage control apparatus 2 includes the switching element 24, the voltage regulating circuit 22, the load response control circuit 26, and the voltage response control circuit 27. The switching element 24 is electrically connected in series with the field winding 11 of the electric generator 1. The voltage regulating circuit 22 regulates the output voltage VB of the generator 1 to the target voltage of the generator 1 by selectively turning on and off the switching element 24. The load response control circuit 26 performs the load response control when the output voltage VB of the generator 1 decreases below the target voltage upon the application of the electrical load 5 to the generator 1. In the load response control, the load response control circuit 26 controls the on/off operation of the switching element 24 to gradually increase the field current If supplied to the field winding 11 of the generator 1. The voltage response control circuit 27 performs the voltage response control when the output voltage VB of the generator 1 decreases below the threshold voltage (i.e., 11.8 V) upon the application of the electrical load 4. In the voltage response control, the voltage response control circuit 27 first changes the target voltage from the first predetermined value (i.e., 14V) to the second predetermined value (i.e., 12V), and then gradually recovers the target voltage from the second predetermined value to the first predetermined value after the output voltage VB of the generator 1 is recovered to exceed the threshold voltage. Furthermore, when the output voltage VB of the generator 1 decreases below the threshold voltage upon the application of the electrical load 4, the rotational speed Ne of the engine 7 fluctuates to repeatedly increase and decrease until it converges on the target idle speed Ne1. During the time periods t0-t3, t4-t5, and t6-t7, in which the rotational speed Ne of the engine 7 decreases, the field current If is gradually increased at the predetermined rate ΔIf/Δt under the load response control by the load response control circuit 26. During the time periods t3-t4, t5-t6, and t7-t8, in which the rotational speed Ne of the engine 7 increases, the field current If is gradually increased under the voltage response control by the voltage response control circuit 27.

With the above configuration, it is possible to suppress the increase in the field current If by the load response control when the rotational speed Ne of the engine 7 decreases and by the voltage response control when the rotational speed Ne of the engine 7 increases. Consequently, it becomes possible to suppress the increase in the field current If for the entire time period from the application of the electrical load 4 to the convergence of the rotational speed Ne of the engine 7 on the target idle speed N1. As a result, it becomes possible to effectively suppress the fluctuation in the output voltage VB of the generator 1, thereby realizing an early convergence of the rotational speed Ne of the engine 7 on the target idle speed Ne1.

In particular, by suppressing the increase in the field current If through the voltage response control when the rotational speed Ne increases, it becomes possible to effectively suppress the peak torque of the generator 1, thereby allowing the rotational speed Ne of the engine 7 to converge on the target idle speed Ne1 in an earlier stage.

Moreover, in the present embodiment, the voltage control apparatus 2 further includes the rotational speed response control circuit 227 and the shift circuit 228. The rotational speed response control circuit 227 performs the rotational speed response control to set the target voltage of the generator 1 according to the rotational speed Ngen of the generator 1. When the output voltage VB of the generator 1 decreases below the threshold voltage upon the application of the electrical load 4, the shift circuit 228 disables the rotational speed response control for a predetermine time period from the decrease in the output voltage VB of the generator 1.

With the above configuration, when the output voltage VB of the generator 1 is above the threshold voltage, it is possible to achieve the same advantages as Japanese Unexamined Patent Application Publication No. 2002-17053. Additionally, when the output voltage VB of the generator 1 is lowered below the threshold voltage, it is possible to prevent the output voltage VB of the generator 1 from fluctuating in synch with the rotational speed Ne of the engine 7, thereby allowing the output voltage VB to be stabilized in an earlier stage.

Further, in the present embodiment, the predetermined time period, for which the shift circuit 228 disables the rotational speed response control, is set to be longer than the time period from the decrease in the output voltage VB of the generator 1 below the threshold voltage to the recovery of the target voltage of the generator 1 to the first predetermined value.

With the above configuration, it is possible to more reliably suppress the increase in the field current If by the voltage response control when the rotational speed Ne of the engine 7 increases.

While the above particular embodiment of the present invention has been shown and described, it will be understood by those skilled in the art that various modifications, changes, and improvements may be made without departing from the spirit of the invention.

For example, in the previous embodiment, the voltage response control circuit 27 is configured with an analog delay circuit that has the RC time constant created by the resistor 273 and the capacitor 274. However, it is also possible to configure the voltage response control circuit 27 with a digital delay circuit that has the same time constant as the analog delay circuit.

Moreover, in the previous embodiment, the threshold voltage is set to 11.8V. However, it is also possible to set the threshold voltage to be lower than the terminal voltage of the battery 3 before the application of the electrical load 4 but higher than the discharge end voltage (e.g., 10V) of the battery 3.

What is claimed is:

1. A voltage control apparatus for controlling an output voltage of an electric generator, wherein the electric generator includes a field winding and is driven by an engine of a motor vehicle and electrically connected to charge a battery, the voltage control apparatus comprising:
 a switching element that is electrically connected in series with the field winding of the electric generator;
 a voltage regulator that regulates the output voltage of the electric generator to a target voltage of the electric generator by selectively turning on and off the switching element;
 a load response controller that performs a load response control when the output voltage of the electric generator decreases below the target voltage upon the application of an electrical load to the electric generator, wherein in the load response control, the load response controller controls the on/off operation of the switching element to gradually increase field current supplied to the field winding of the electric generator; and
 a voltage response controller that performs a voltage response control when the output voltage of the electric generator decreases below a threshold voltage upon the application of the electrical load, wherein in the voltage response control, the voltage response controller first changes the target voltage from a first predetermined value to a second predetermined value, the second predetermined value being lower than the first predetermined value but higher than the threshold voltage, and then gradually recovers the target voltage from the second predetermined value to the first predetermined value after the output voltage of the electric generator is recovered to exceed the threshold voltage, and
 wherein
 when the output voltage of the electric generator decreases below the threshold voltage upon the application of the electrical load, the rotational speed of the engine fluctuates to repeatedly increase and decrease until it is stabilized,
 during the time periods in which the rotational speed of the engine decreases, the field current is gradually increased under the load response control by the load response controller, and
 during the time periods in which the rotational speed of the engine increases, the field current is gradually increased under the voltage response control by the voltage response controller.

2. The voltage control apparatus as set forth in claim 1, further comprising:
 a rotational speed response controller that performs a rotational speed response control in which the rotational speed response controller sets the target voltage of the electric generator according to the rotational speed of the electric generator; and
 a disabler that disables, when the output voltage of the electric generator decreases below the threshold voltage upon the application of the electrical load, the rotational speed response control for a predetermine time period from the decrease in the output voltage of the electric generator.

3. The voltage control apparatus as set forth in claim 2, wherein the predetermined time period, for which the disabler disables the rotational speed response control, is set to be longer than the time period from the decrease in the output voltage of the electric generator below the threshold voltage to the recovery of the target voltage of the electric generator to the first predetermined value.

* * * * *